US010275396B1

(12) United States Patent
Hart

(10) Patent No.: US 10,275,396 B1
(45) Date of Patent: Apr. 30, 2019

(54) TECHNIQUES FOR DATA CLASSIFICATION BASED ON SENSITIVE DATA

(71) Applicant: Symantec Corporation, Mountain View, CA (US)

(72) Inventor: Michael Hart, Farmington, CT (US)

(73) Assignee: SYMANTEC CORPORATION, Mountain View, CA (US)

(*) Notice: Subject to any disclaimer, the term of this patent is extended or adjusted under 35 U.S.C. 154(b) by 288 days.

(21) Appl. No.: 14/494,020

(22) Filed: Sep. 23, 2014

(51) Int. Cl.
*G06F 16/11* (2019.01)
*G06F 16/13* (2019.01)

(52) U.S. Cl.
CPC ............ *G06F 16/13* (2019.01); *G06F 16/122* (2019.01)

(58) Field of Classification Search
CPC ......... G06F 17/30091; G06F 17/30082; G06F 16/13; G06F 16/122
USPC .................................................. 707/737, 738
See application file for complete search history.

(56) References Cited

U.S. PATENT DOCUMENTS

| | | | | |
|---|---|---|---|---|
| 5,557,765 A | * | 9/1996 | Lipner | H04L 9/3271 380/285 |
| 8,181,036 B1 | * | 5/2012 | Nachenberg | H04L 63/1416 709/224 |
| 2007/0195779 A1 | * | 8/2007 | Judge | H04L 12/585 370/392 |
| 2008/0027940 A1 | * | 1/2008 | Canning | G06F 17/3012 |
| 2008/0215622 A1 | * | 9/2008 | Jordan | G06F 17/30306 |
| 2010/0011000 A1 | * | 1/2010 | Chakra | G06F 21/62 707/E17.005 |
| 2010/0208955 A1 | * | 8/2010 | Mehes | G01N 21/6452 382/128 |
| 2011/0066529 A1 | * | 3/2011 | Larsen | G06Q 40/02 705/30 |
| 2013/0262418 A1 | * | 10/2013 | Bhasin | G06F 17/30082 707/694 |
| 2014/0059700 A1 | * | 2/2014 | Kiriyama | G06F 21/62 726/27 |
| 2014/0172652 A1 | * | 6/2014 | Pobbathi | G06Q 10/087 705/28 |
| 2014/0201208 A1 | * | 7/2014 | Satish | G06F 21/564 707/737 |
| 2015/0254303 A1 | * | 9/2015 | Saadat | G06F 17/30321 707/716 |
| 2016/0028761 A1 | * | 1/2016 | Sitsky | H04L 63/1441 726/23 |

* cited by examiner

*Primary Examiner* — Syling Yen
*Assistant Examiner* — Faezeh Forouharnejad
(74) *Attorney, Agent, or Firm* — Maschoff Brennan

(57) ABSTRACT

Techniques for data classification may be realized as a method including: selecting from a group of files a sample set representing fewer than all of the files; classifying each file in the sample set, wherein classifying each file includes identifying whether each file represents sensitive information; and providing an estimate for the group of files based on the classification of each file in the sample set, including an estimate of sensitive information within the group of files.

18 Claims, 4 Drawing Sheets

TECHNIQUES FOR DATA CLASSIFICATION BASED ON SENSITIVE DATA

FIELD OF THE DISCLOSURE

The present disclosure relates generally to data loss prevention and, more particularly, to techniques for data classification.

BACKGROUND OF THE DISCLOSURE

One technique in the field of data loss prevention is to categorize data available on a system, particularly by identifying sensitive data which might be the target of malicious activity. However, even when automated methods for categorizing and identifying sensitive data exist, users are reluctant to engage in the significant time and resources necessary to carry out the automated processes on large data sets.

In view of the foregoing, it may be understood that there may be significant problems and shortcomings associated with current data loss prevention techniques.

SUMMARY OF THE DISCLOSURE

Techniques for data classification are disclosed. In one embodiment, the techniques may be realized as a method comprising the steps of selecting from a group of files a sample set representing fewer than all of the files; classifying each file in the sample set, wherein classifying each file includes identifying whether each file represents sensitive information; and providing an estimate for the group of files based on the classification of each file in the sample set, including an estimate of sensitive information within the group of files.

In accordance with other aspects of this embodiment, the number of files selected for the sample set can be based on a desired level of accuracy for the resulting estimate. The desired level of accuracy can be specified by a user who initiates a data scan of the group of files.

In accordance with other aspects of this embodiment, the method may further comprise, subsequent to providing the estimate, identifying a user's access of a file in the group of files as potentially accessing sensitive information based on the estimate of sensitive information within the group of files.

In accordance with other aspects of this embodiment, selecting the sample set from the group of files can include randomly selecting files from the group of files until enough files are selected to meet a predetermined sampling threshold.

In accordance with other aspects of this embodiment, classifying each file in the sample set can be based on metadata associated with the file.

In accordance with other aspects of this embodiment, classifying each file in the sample set can use an automated classifier trained to classify files based on machine learning.

In accordance with another exemplary embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another exemplary embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
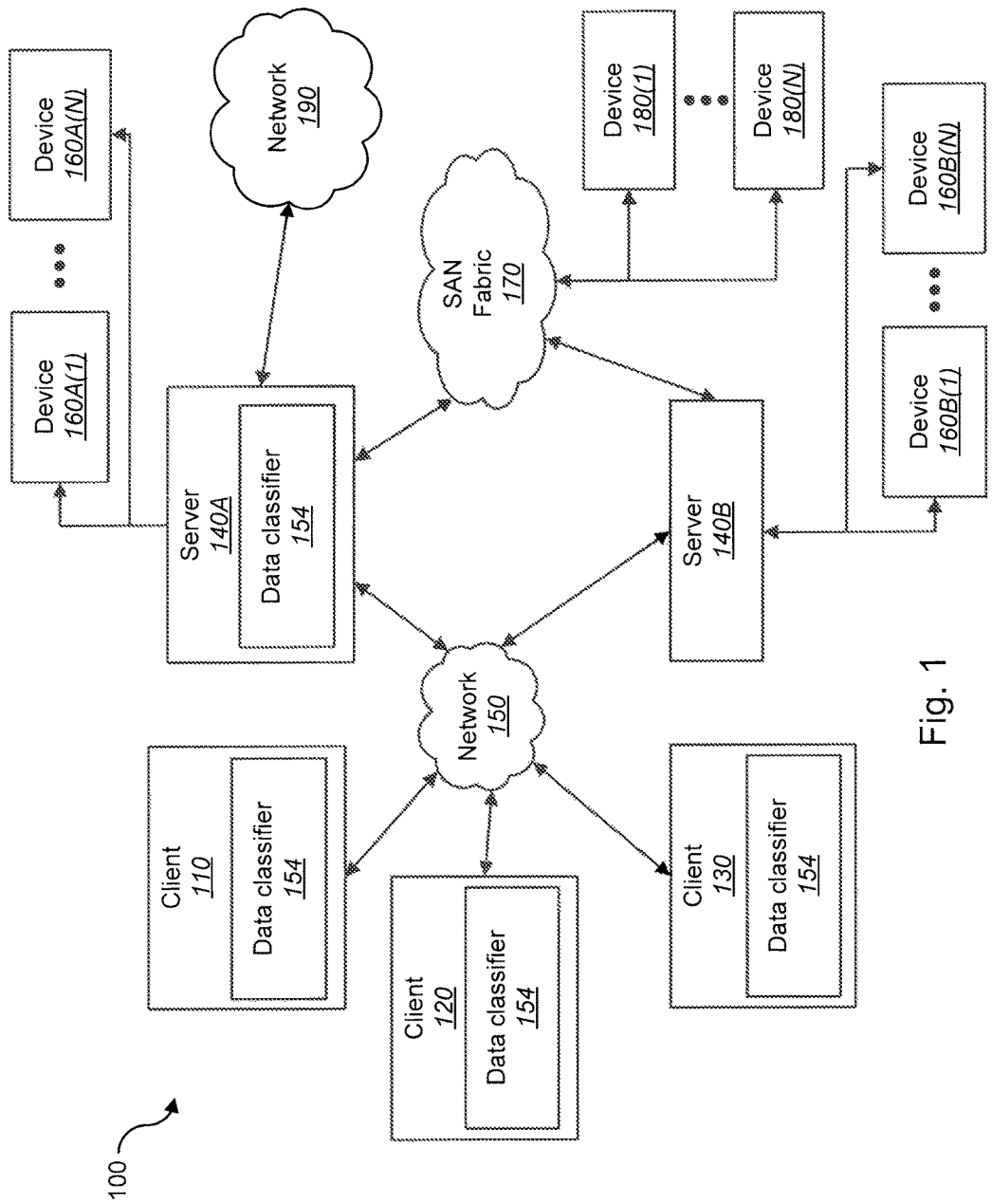
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
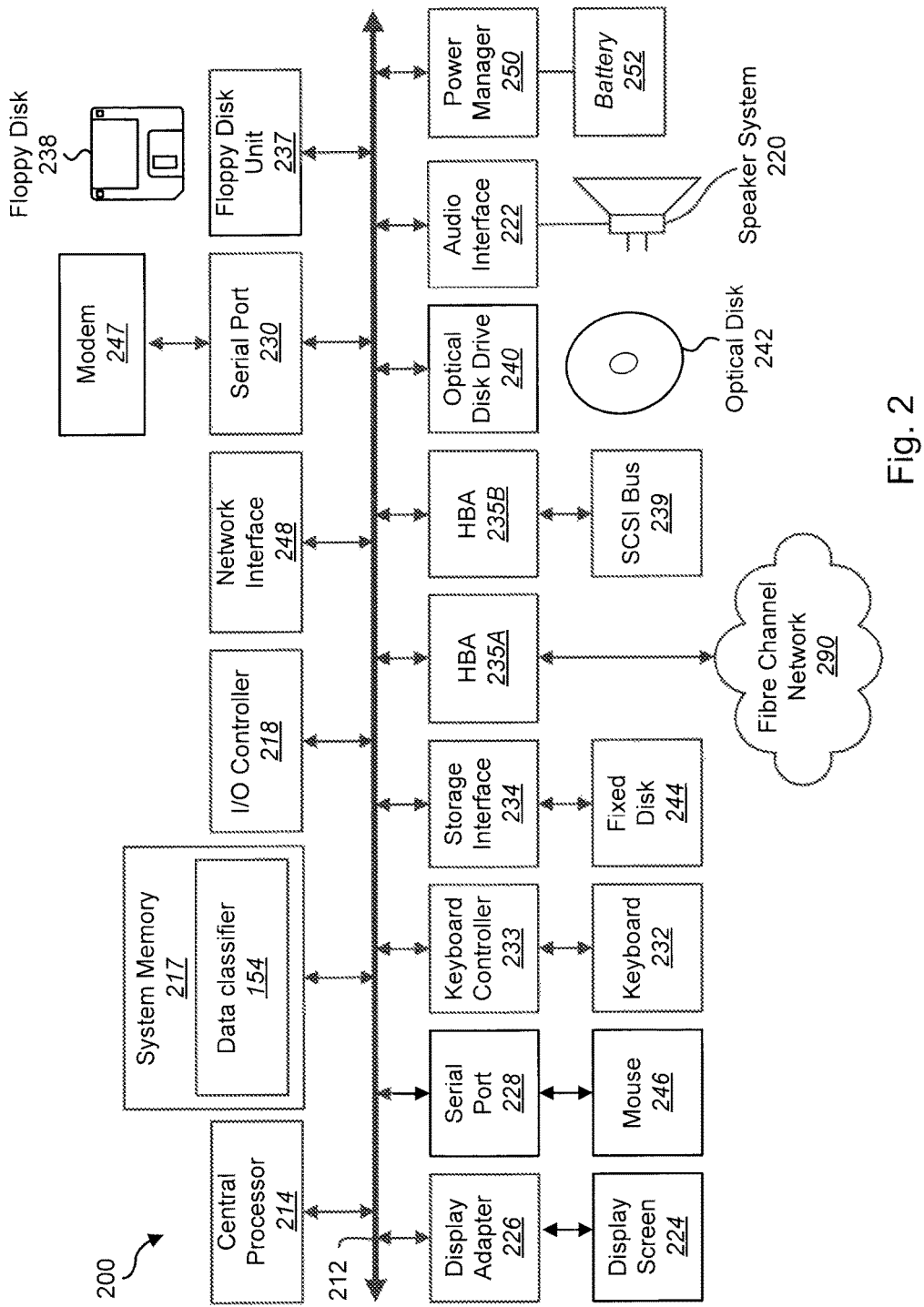
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 and/or server 140A may contain one or more portions of software for implementation of data classification processes such as, for example, data classifier 154. Further, one or more portions of the data classifier 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including data classifier 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, data classifier 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
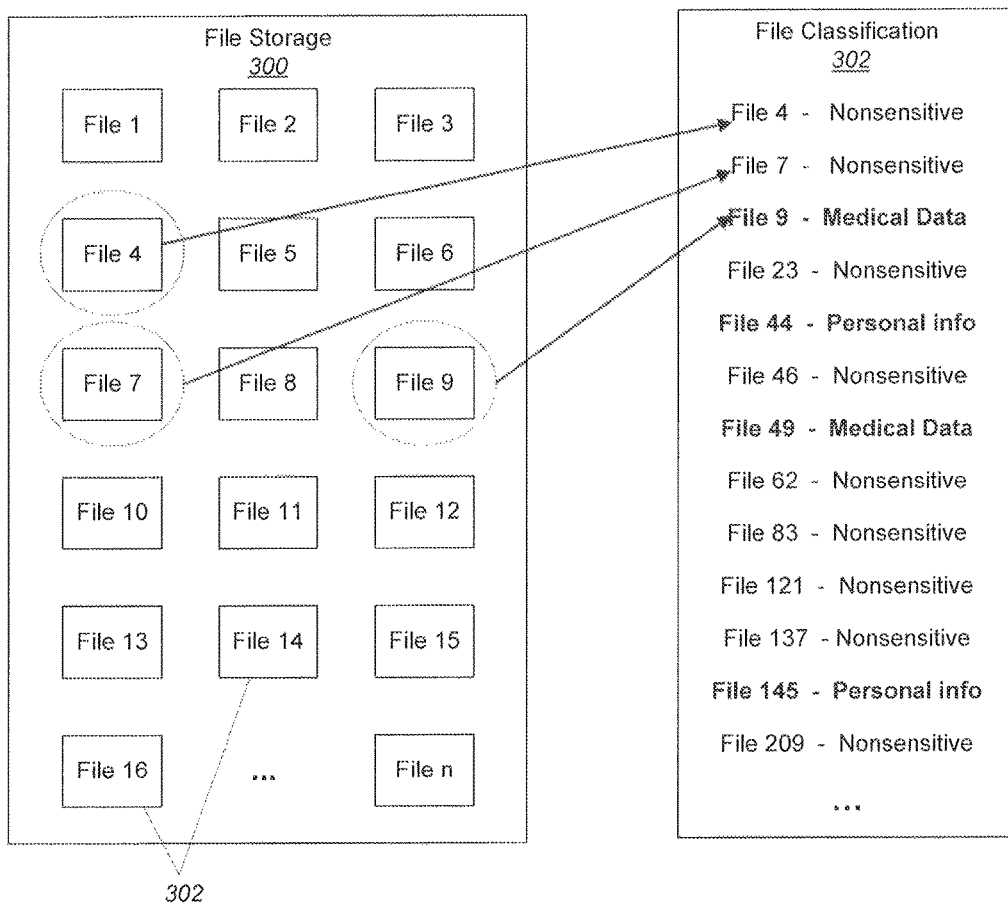
FIG. 3 shows a block diagram illustrating a method for file sampling and classification.

In one embodiment the data classifier 154 may be configured to provide an assessment of the data resident in file storage 300 as illustrated in FIG. 3. The file storage 300 may be any file storage associated with the system, such as for example any of devices 160A(1-N), 160B(1-N), or 180(1-N) illustrated in FIG. 1 or any of the data storage devices illustrated in FIG. 2. File storage 300 may also represent a particular file directory, partition, or drive, and may therefore represent only part of the data of a storage device or may represent data stored over multiple devices.

As shown, file storage 300 includes a plurality of files 302. In some implementations, file storage 300 may include hundreds of thousands or millions of files 302. As illustrated, the file classifier selects a sample of files 302 representing fewer than all of the files in storage 300; ideally, this selection process is randomized to generate a representative sample.

Each of the selected files 302 is classified by means of a classifier, which in some implementations may use machine learning techniques to match file information and metadata to a known set of training files in order to classify data. Data may be classified in a number of ways, and in some implementation is matched against one or more known types of sensitive data. Each file may therefore be classified as "nonsensitive" (meaning that it did not match one of the identified types of sensitive data) or may be identified with one of the sensitive data types.

What data is sensitive, and therefore which files will be identified as sensitive and which classifications are used, will depend on the needs of a particular user. Some common categories of sensitive data include "personally identifiable information," "medical data," "financial data," and "source code." Matters which are particularly sensitive due to local rules/laws or policies of a particular company may have their own data types for that company's implementation of a classifier.

Figure 4:
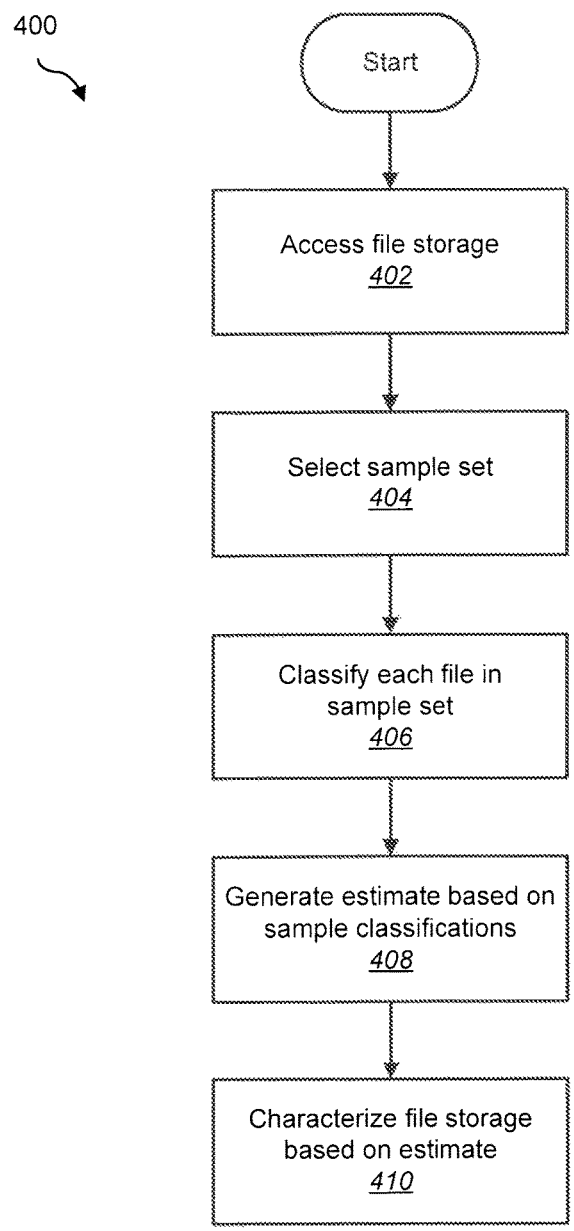
FIG. 4 shows a method for file classification in accordance with an embodiment of the present disclosure.

FIG. 4 illustrated a method 400 for classifying data based on random sampling. As described above, the file storage may be any collection of files for which a characterization is desired without analyzing all of the files.

The classifier accesses file storage (402). The system may identify the total number of files available in storage and metadata about each of the files. In some implementations, the decision to use sampling rather than to classify every file may be made after the number of files is known or exceeds a certain threshold such that it is considered burdensome to scan every file.

A sample set of files is selected (404). The size of the sample set may be determined by a number of factors, for instance by the desired accuracy of the analysis. It is well-known in the art of statistical sampling that, in determining a single proportion within a population, the following approximation applies:

$$n=1/B^2$$

Where B is the desired error bound and n is the sample size. So, for example, a sample size of n=10,000 is sufficient to determine a proportion within an error bound of 0.01 in either direction, or ±1%. Applying this to the present case, we can provide an estimate of the proportion of sensitive files within file storage that is accurate within ±1% by classifying 10,000 randomly selected files from the file storage. Other sample sizes may be used when other rates of precision are necessary, but the ability to estimate the quantity of sensitive information in even millions of files by sampling just a small fraction of them provides significant opportunity for efficient analysis.

Each file in the sample set is classified (406). As described above, the classification process may be performed by a module which may include any techniques now known in the art or later developed for accurately identifying sensitive information. This may include the use of metadata such as file types, names, and file paths, which may provide insights into whether a file is sensitive data of a particular type. A classification module as may include policy templates reflecting information that is sensitive due to various policies and regulations, data identifiers for matching data types for personally identifiable information, and solution packs which may include specialized logic preconfigured for particular applications and industries. A module may be configured to employ multiple classes of detection technology, including a) "describing" to perform content matches on keywords, expressions, or patterns, b) "fingerprinting" for exact or partial content matched on indexed data sources and documents, and c) learning by building statistical models using example documents and calculating content similarity.

An estimate is generated based on the classifications for the files in the sample (408). This estimate may take a form of a range of numbers of files that may be sensitive within a given collection. As an example, after selecting a sample of 10,000 files from a backup system containing 1 million files, the system may have identified 330 files that include personally identifiable information. The estimate may therefore reflect this number as well as the error bound of ±1% and may generate the estimate that the backup system includes between 32,670 and 33,330 files with personally identifiable information—approximately 3% of the files. Further statistical analysis may be performed and further details may be supplied as part of the estimate.

Once the estimate has been generated, it may be used to characterize the file storage (410). Furthering the example above, the backup system may subsequently be referred to as "including 3% sensitive files." The characterization may also be used as the basis for subsequent decisions, such as whether or not certain safeguards need to be applied to the backup system based on the quantity of sensitive files therein. Unanalyzed files drawn from the backup system may also be flagged for alert as having a probability of including personally identifiable information.

As one particular application of the techniques described herein, automated monitoring of user activity may be aided by the presence of characterized file storage. For example, certain automated systems may be designed to identify uncharacteristically high levels of file access by particular users. In some implementations, the system may be able to prioritize file accesses as more likely to represent prohibited activity if the files accessed are characterized as likely to represent sensitive data.

Furthermore, by classifying sensitive data of different types and comparing those types to particular user areas of responsibility, anomalies in type rather than number can be detected. For instance, an insurance claims manager may typically come in contact with sensitive medical data but not confidential company financial data. Therefore, an insurance claims manager accessing several files that are characterized as likely to represent company financial data can be flagged for further investigation even if the total volume of accesses of sensitive files is not unusual for the employee's position.

At this point it should be noted that techniques for data classification in accordance with the present disclosure as described above may involve the processing of input data and the generation of output data to some extent. This input data processing and output data generation may be implemented in hardware or software. For example, specific electronic components may be employed in a data classifier, machine learning module, security server, or similar or related circuitry for implementing the functions associated with data classification in accordance with the present disclosure as described above. Alternatively, one or more processors operating in accordance with instructions may implement the functions associated with data classification in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for data loss prevention, the method being performed by a computing device comprising at least one processor, the method comprising:
    selecting, by the at least one processor, from a group of electronic files within a file storage a sample set representing fewer than all of the electronic files in the file storage;
    classifying, by the at least one processor, each electronic file in the sample set, by using machine learning to build statistical models using example documents and calculating content similarity, wherein each electronic file within the sample set found to contain sensitive information is classified as a sensitive file and each electronic file within the sample set found to lack sensitive information is classified as a nonsensitive file;
    further classifying each sensitive file into a category based on a type of sensitive information contained in the sensitive file, wherein the type of sensitive information includes at least one of personally identifiable information, medical data, financial data, or source code;
    generating, by the at least one processor, an estimate for the group of electronic files based on the classifications of each electronic file in the sample set, wherein the estimate identifies a volume of sensitive information within the group of electronic files and the category of sensitive information within the group of electronic files; and
    applying, by the at least one processor, a safeguard to the group of electronic files when the estimate of the volume of sensitive information within the group of electronic files exceeds a predetermined quantity,
    wherein a number of electronic files selected for the sample set is based on a desired level of accuracy for the estimate of sensitive information such that an error rate for the estimate of sensitive information is substantially constrained within a predetermined percentage range, and
    wherein the safeguard flags for further investigation a user's access of an electronic file in the group of electronic files based on the category of sensitive information identified for the group of electronic files.

2. The method of claim 1, wherein the desired level of accuracy is specified by a user who initiates a data scan of the group of electronic files.

3. The method of claim 1, wherein:
    the safeguard also flags for further investigation the user's access of an electronic file in the group of electronic files based on the estimate of the volume of sensitive information identified for the group of electronic files.

4. The method of claim 1, wherein selecting the sample set from the group of electronic files comprises randomly selecting, by the at least one processor, electronic files from the group of electronic files until enough electronic files are selected to meet a predetermined sampling threshold.

5. At least one non-transitory processor readable storage medium storing a computer program of instructions configured to be readable by at least one processor for instructing the at least one processor to execute a computer process for performing the method as recited in claim 1.

6. An article of manufacture for data loss prevention comprising:
    at least one processor readable storage medium; and
    instructions stored on the at least one medium;
    wherein the instructions are configured to be readable from the at least one medium by at least one processor and thereby cause the at least one processor to operate so as to:
        select from a group of electronic files within a file storage a sample set representing fewer than all of the electronic files in the file storage;
        classify each electronic file in the sample set, by using machine learning to build statistical models using example documents and calculating content similarity, wherein each electronic file within the sample set found to contain sensitive information is classified as a sensitive file and each electronic file within the sample set found to lack sensitive information is classified as a nonsensitive file;

further classify each sensitive file into a category based on a type of sensitive information contained in the sensitive file, wherein the type of sensitive information includes at least one of personally identifiable information, medical data, financial data, or source code;

generate an estimate for the group of electronic files based on the classifications of each electronic file in the sample set, wherein the estimate identifies a volume of sensitive information within the group of electronic files and the category of sensitive information within the group of electronic files; and apply a safeguard to the group of electronic files when the estimate of the volume of sensitive information within the group of electronic files exceeds a predetermined quantity, wherein a number of electronic files selected for the sample set is based on a desired level of accuracy for the estimate of sensitive information such that an error rate for the estimate of sensitive information is substantially constrained within a predetermined percentage range, and wherein the safeguard flags for further investigation a user's access of an electronic file in the group of electronic files based on the category of sensitive information identified for the group of electronic files.

7. The article of claim 6, wherein the desired level of accuracy is specified by a user who initiates a data scan of the group of electronic files.

8. The article of claim 6, wherein the safeguard also flags for further investigation the user's access of an electronic file in the group of electronic files based on the estimate of the volume of sensitive information identified for the group of electronic files.

9. The article of claim 6, wherein selecting the sample set from the group of electronic files comprises randomly selecting electronic files from the group of electronic files until enough electronic files are selected to meet a predetermined sampling threshold.

10. A system for data loss prevention comprising:
one or more processors communicatively coupled to a network; wherein the one or more processors are configured to:
select from a group of electronic files within a file storage a sample set representing fewer than all of the electronic files in the file storage;
classify each electronic file in the sample set, by using machine learning to build statistical models using example documents and calculating content similarity, wherein each electronic file within the sample set found to contain sensitive information is classified as a sensitive file and each electronic file within the sample set found to lack sensitive information is classified as a nonsensitive file;
further classify each sensitive file into a category based on a type of sensitive information contained in the sensitive file, wherein the type of sensitive information includes at least one of personally identifiable information, medical data, financial data, or source code;
generate an estimate for the group of electronic files based on the classifications of each electronic file in the sample set, wherein the estimate identifies a volume of sensitive information within the group of electronic files and the category of sensitive information within the group of electronic files; and
apply a safeguard to the group of electronic files when the estimate of the volume of sensitive information within the group of electronic files exceeds a predetermined quantity,
wherein a number of electronic files selected for the sample set is based on a desired level of accuracy for the estimate of sensitive information such that an error rate for the estimate of sensitive information is substantially constrained within a predetermined percentage range, and
wherein the safeguard flags for further investigation a user's access of an electronic file in the group of electronic files based on the category of sensitive information identified for the group of electronic files.

11. The system of claim 10, wherein the safeguard also flags for further investigation the user's access of an electronic file in the group of electronic files based on the estimate of the volume of sensitive information identified for the group of electronic files.

12. The system of claim 10, wherein selecting the sample set from the group of electronic files comprises randomly selecting electronic files from the group of electronic files until enough electronic files are selected to meet a predetermined sampling threshold.

13. The method of claim 1 further comprising, prior to the step of selecting the sample set of files:
identifying the total number of electronic files in the file storage; and
determining that the total number of electronic files exceeds a threshold amount.

14. The article of claim 6, wherein the instructions are configured to cause the at least one processor to operate so as to identify the total number of electronic files in the file storage and determine that the total number of electronic files exceeds a threshold amount.

15. The system of claim 10, wherein the one or more processors are further configured to identify the total number of electronic files in the file storage and determine that the total number of electronic files exceeds a threshold amount.

16. The method of claim 1, wherein the safeguard further includes flagging unanalyzed electronic files within the file storage as having a probability of including sensitive information.

17. The article of claim 6, wherein the safeguard further includes flagging unanalyzed electronic files within the file storage as having a probability of including sensitive information.

18. The system of claim 10, wherein the safeguard further includes flagging unanalyzed electronic files within the file storage as having a probability of including sensitive information.

* * * * *